US012066562B2

(12) United States Patent
Zhang et al.

(10) Patent No.: US 12,066,562 B2
(45) Date of Patent: *Aug. 20, 2024

(54) DEVICE LOCATION NETWORK

(71) Applicant: Alarm.com Incorporated, Tysons, VA (US)

(72) Inventors: John Zhang, Chicago, IL (US); Tim Yao, McLean, VA (US); William Wireko Mensah, Fairfax, VA (US)

(73) Assignee: Alarm.com Incorporated, Tysons, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/992,992

(22) Filed: Nov. 23, 2022

(65) Prior Publication Data

US 2023/0080188 A1   Mar. 16, 2023

Related U.S. Application Data

(63) Continuation of application No. 16/446,842, filed on Jun. 20, 2019, now Pat. No. 11,531,082.

(60) Provisional application No. 62/687,271, filed on Jun. 20, 2018.

(51) Int. Cl.
*G01S 5/02* (2010.01)
*G01S 5/14* (2006.01)
*H04Q 9/00* (2006.01)

(52) U.S. Cl.
CPC .............. *G01S 5/0284* (2013.01); *G01S 5/14* (2013.01); *H04Q 9/00* (2013.01); *H04Q 2209/40* (2013.01)

(58) Field of Classification Search
CPC ........... G01S 5/0284; G01S 5/14; H04Q 9/00; H04Q 2209/40; H04Q 2209/43
See application file for complete search history.

(56) References Cited

U.S. PATENT DOCUMENTS

| 8,350,694 B1 | 1/2013 | Trundle et al. |
| 9,590,863 B1 | 3/2017 | Martin |
| 9,619,989 B1 | 4/2017 | Ewing et al. |
| 10,034,129 B1 | 7/2018 | Ellis et al. |

(Continued)

OTHER PUBLICATIONS alarm.com. "Alarm.com Z-Wave Installation Guide." Jun. 8, 2016 (Jun. 8, 2016) Retrieved on Aug. 24, 2019 (Aug. 24, 2019) from <https://www.24incontrol.com/sites/default/files/Z-WaveInstallation_2GiG%20Go%21Control%201_2.pdf> entire document.

(Continued)

*Primary Examiner* — Amine Benlagsir
(74) *Attorney, Agent, or Firm* — Fish & Richardson P.C.

(57) ABSTRACT

Methods, systems, and apparatus, including computer programs encoded on a computer storage medium, for identifying, at a monitoring system, a location of a device panel, the device panel being configured to communicate with a position module of the monitoring system; obtaining, by the position module, location information for a plurality of anchor devices, each anchor device of the plurality of anchor devices being located within a predefined area of a property; determining, by the position module, a respective location of each anchor device within the predefined area based on analysis of the location information for the plurality of anchor devices; and determining, by the position module, a location for a sensor in the predefined area based on the respective location of at least one anchor device.

16 Claims, 4 Drawing Sheets

(56) References Cited

U.S. PATENT DOCUMENTS

| | | | |
|---|---|---|---|
| 2010/0289643 A1 | 11/2010 | Trundle et al. | |
| 2010/0289644 A1 | 11/2010 | Slavin et al. | |
| 2012/0036198 A1* | 2/2012 | Marzencki | H04W 52/50 |
| | | | 709/206 |
| 2013/0346054 A1 | 12/2013 | Mumtaz | |
| 2017/0005958 A1 | 1/2017 | Frenkel et al. | |
| 2017/0168135 A1* | 6/2017 | Want | G01S 5/30 |
| 2017/0208116 A1 | 7/2017 | Schilit et al. | |
| 2017/0367065 A1 | 12/2017 | Seth et al. | |
| 2018/0007516 A1 | 1/2018 | Ge et al. | |
| 2018/0067191 A1 | 3/2018 | Hamilton | |
| 2018/0088432 A1 | 3/2018 | Shrivastava et al. | |
| 2019/0069263 A1* | 2/2019 | Ylamurto | H04B 17/318 |
| 2021/0120491 A1* | 4/2021 | Gupta | H04L 1/0015 |

OTHER PUBLICATIONS

Extended European Search Report in European Appln. No. EP19822463. 6, dated Jul. 28, 2021, 8 pages.

PCT International Preliminary Report on Patentability in International Application No. PCT/US2019/038226, dated Dec. 22, 2020, 13 pages.

PCT International Search Report and Written Opinion in International Application No. PCT/US2019/038226, dated Sep. 12, 2019, 19 pages.

AU Examination Report in Australian Appln. No. 2019288483, dated Jun. 2, 2023, 3 pages.

AU Notice of acceptance in Australian Appln. No. 2019288483, dated Jan. 10, 2024, 3 pages.

* cited by examiner

DEVICE LOCATION NETWORK

CROSS-REFERENCE TO RELATED APPLICATIONS

This application is a continuation of U.S. application Ser. No. 16/446,842, filed Jun. 20, 2019, which claims the benefit of U.S. Application No. 62/687,271, filed Jun. 20, 2018. The disclosure of each of the foregoing applications is incorporated herein by reference.

FIELD

This specification relates to electronic devices for a property.

BACKGROUND

Security devices are often dispersed at various locations at a property such as a home or commercial business. The devices can have distinct functions at different locations of the property. Knowing the relative positions of the devices at the property is often important for leveraging certain functionality offered by the devices.

SUMMARY

The subject matter described in this document can be embodied in a method implemented using a monitoring system that is configured to monitor a property. The method includes generating, by a sensor that is located at the property, sensor data that reflects an attribute of the property; generating, by a plurality of anchor devices that are located throughout the property, sensor location data that reflects a location of the sensor by communicating with the sensor; receiving, by a monitor control unit, sensor data from the sensor; receiving, from each of the plurality of anchor devices, the sensor location data; determining, using the monitor control unit, a location of the sensor based on each sensor location data; determining, using the monitor control unit, a monitoring system action to perform based on the sensor data and the location of the sensor; and performing, using the monitor control unit, the monitoring system action.

These and other implementations can each optionally include one or more of the following features. For example, in some implementations, the method further includes: determining a change in the location of the sensor relative to the at least one anchor device using a sensor reference signal of the sensor that indicates the location of the sensor. In some implementations, the method further includes: determining relative motion of the sensor using the sensor reference signal of the sensor and the determined change in the location of the sensor relative to the at least one anchor device. In some implementations, determining the location of the sensor is based on the respective location of each anchor device of the plurality of anchor device.

In some implementations, determining the location of the sensor includes: computing a distance metric for the sensor based on the respective location of the at least one anchor device. In some implementations, computing the distance metric includes: computing the distance metric based on a tri-lateration algorithm that uses the respective location of each of the plurality of anchor devices as input parameters of the tri-lateration algorithm; or computing the distance metric based on a multi-lateration algorithm that uses the respective location of each of the plurality of anchor devices as input parameters of the multi-lateration algorithm.

In some implementations, the distance metric comprises at least three distinct distance values that are based on a three-dimensional characteristic of an area at the property. In some implementations, obtaining the location information for the anchor devices includes: scanning the area for sensor signals emitted by each anchor device within the area; detecting a respective sensor signal emitted by each anchor device; and automatically obtaining the location info based on analysis of the respective sensor signal emitted by each anchor device.

In some implementations, the method further includes: determining a location for a second sensor in the area based on the respective location of at least one anchor device; and generating a positional mapping of the sensor and the second sensor in the area using the location of the sensor and the location of the second sensor. In some implementations, each of the plurality of anchor devices is at least one of: a Z-Wave enabled device, a Bluetooth enabled device, a Wi-Fi enabled device, or a radio device. In some implementations, the location information for the plurality of anchor devices is obtained in response to user input that specifies the location information for each of the anchor devices.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

Like reference numbers and designations in the various drawings indicate like elements.

DETAILED DESCRIPTION

A property, such as a house or a place of business, can be equipped with a monitoring system to enhance the security of the property. The property monitoring system may include one or more sensors, such as cameras, motion detectors, or temperature sensors distributed about the property to monitor conditions at the property. In many cases, the property monitoring system also includes one or more controls, which enable automation of various property actions, such as locking/unlocking a door, setting a thermostat, or detecting motion at the property. The property monitoring system can also include a control panel and multiple anchor devices (e.g., central nodes) that are configured to provide information to the control panel about signals emitted by each sensor at the property.

In this context, techniques are described for determining a relative location of one or more sensors at a property using a known location of at least one anchor device and signals emitted from the sensors. The location of the anchor device is obtained by the control panel based on manual input by a user. In some implementations, the anchor device determines its own location at the property by referencing spatial dimensions obtained from a digital floorplan of the property. The anchor device receives the signals (e.g., radio signals) emitted by at least one sensor and processes the signals to extract data for determining a location of the sensor. The anchor device provides the extracted signal data to the control panel.

In some cases, the control panel communicates with the monitoring server to analyze the sensor signal data to compute distance values for determining a current location of the sensor at the property. For example, the control panel can send the sensor signal data for analysis at the monitoring server. In some implementations, a sensor could itself be an anchor for other sensors. For example, a door lock sensor could act as an anchor device for tracking or determining the location of a sensor for a key fob or the location of a door/contact sensor.

The signal data includes dimension measurements for rooms or exterior areas of the property. The signal data can also include dimension values describing a sensor's distance to one or more anchor devices at the property. For example, the signal data can include a set of distance data that indicates a sensors distance to an anchor device using respective values for each of three dimensions [x, y, z] of a room at the property. The monitoring server and the control panel interact to analyze the signal data to determine the sensor's location (or relative motion) with reference to the x, y, and z dimensional axis. For example, the monitoring system determines the sensor's location by using multi-lateration calculations to process signal data transmitted from the sensor. In some implementations, the system uses location multi-lateration to determine the senor's location based on emitted signals that traverse a scanning region form by two or more anchor devices that are co-located at the property.

As described in more detail below, by integrating the sensors and anchor devices at the property within a property monitoring system using the described techniques, the system can quickly and reliably determine a sensor's location at the property. Referencing location or motion data for the sensors enables a property owner to determine whether a sensor has been moved or tampered with. Hence, the safety and security provided by the property monitoring system can be enhanced or improved relative to other monitoring systems based on the described teachings.

Figure 1:
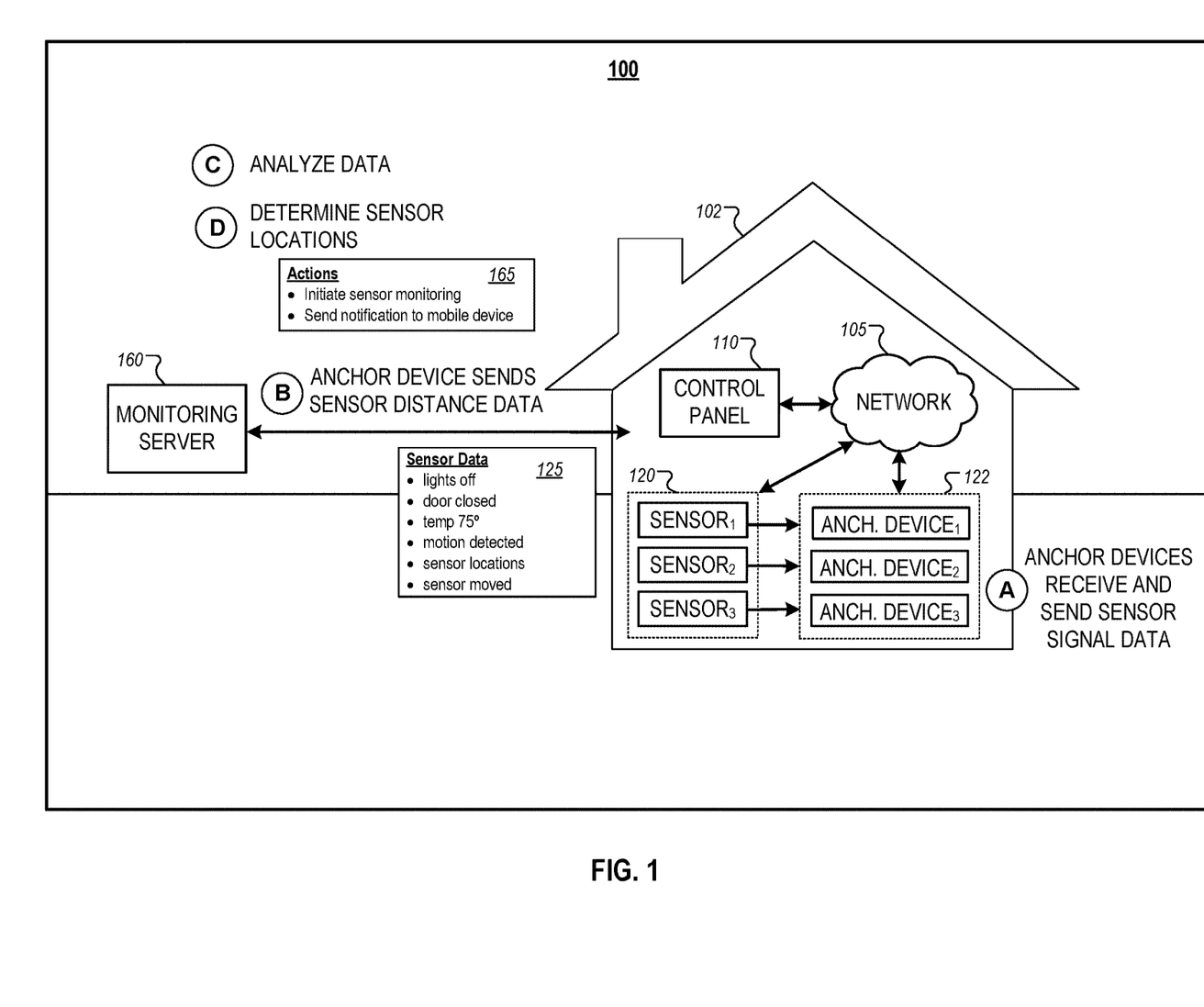
FIG. 1 shows a block diagram of a computing system for locating devices at a property.

FIG. 1 shows a block diagram of a computing system 100 for locating or determining a location of sensors and other devices at a property. The system 100 includes a property 102 monitored by a property monitoring system. The property 102 may be, for example, a residence, such as a single family home, a townhouse, a condominium, or an apartment. In some examples, the property 102 may be a commercial property, a place of business, or a public property.

The property monitoring system includes a control panel 110 at the property 102 that sends sensors data 125 to a remote monitoring server 160. The system also includes one or more sensors 120 that emit signals that indicate different conditions at the property and one or more anchor devices 122 that are configured to detect signals emitted by each of the one or more sensors 120. The sensors 120 may include, for example, proximity sensors, door/window sensors that detect opening and closing of a door or window, cameras that capture video or still images of an area of the property 102, or motion detectors that sense movement in a region of the property 102. The sensors 120 may also include appliance sensors, utility or resource usage sensors, microphones, temperature, humidity, or other sensors.

The anchor devices 122 can be central nodes that receive signals emitted by the sensors 120 and processes the received signals to obtain data about each of the sensors 120. By receiving and analyzing both property data 125 and data about each of the sensors 120, the monitoring server 160 performs various functions that can enhance the security and safety of the property. In some implementations, the sensors 120 may be related to one or more controls of the property 102. For example, a sensor 120 may be integrated with a thermostat of a heating, ventilation, and air-conditioning (HVAC) system of the property 102. The sensor 120 may report the current HVAC temperature setting or the current temperature measured by the HVAC system.

In some examples, the sensors 120 may be related to entrance points to, or egress points from, the property 102. For example, a sensor 120 can detect whether a door or window is open or unlocked. A sensor 120 may report which resident's code or FOB device was used to unlock a door. In some examples, the sensors 120 may report the security status of the property monitoring system (e.g., armed, disarmed, etc.).

The system 100 also includes a control panel 110 that is located at the property 102. The control panel 110 may be, for example, a computer system or other electronic device configured to communicate with the sensors 120 and perform various functions for the property monitoring system. The control panel 110 may include a processor, a chipset, a memory system, or other computing hardware. In some cases, the control panel 110 may include application-specific hardware, such as a field-programmable gate array (FPGA), an application-specific integrated circuit (ASIC), or other embedded or dedicated hardware. The control panel 110 may include software, which configures the unit to perform the functions described in this disclosure. In some implementations, the property owner or a resident of the property 102 communicates with the control panel 110 through a physical connection (e.g., touch screen, keypad, etc.) and/or network connection. In some implementations, the property owner or resident communicates with the control panel 110 through a software ("smart home") application installed on their mobile device.

Each of the sensors 120 and anchor devices 122 communicate with the control panel 110, possibly through a network 105. The network 105 may be any communication infrastructure that supports the electronic exchange of data between the control panel 110, the one or more sensors 120, and each anchor device 122. The network 105 may include a local area network (LAN), a wide area network (WAN), the Internet, or other network topology. The network 105 may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, anchor devices are specific types of sensor devices (e.g., Z-Wave device) that leverage communication protocols of one or more technologies to receive and process radio signals emitted by each sensor 120. In some implementations, the network 105 may include optical data links. To support communications through the network 105, one or more devices of the monitoring system may include communications modules, such as a modem, transceiver, modulator, or other hardware or software configured to enable the device to communicate electronic data through the network 105.

The sensors 120 send various sensor data to the control panel 110. For example, the sensors 120 can send image or video data from one or more camera sensors, motion sensing data from one or more motion detectors, or data related to a setting of device connected to the monitoring system (e.g., a door open setting, a door lock setting, the status of the system, etc.). The sensor data transmitted by the sensors 120 are encoded in radio signals emitted by the sensors. The control panel 110 can also communicate with one or more home automation controls 122 of the property 102. The controls 122 can include, for example, one or more of a thermostat, humidifier, door locks, interior or exterior lights. In some implementations, the control panel 110 performs various operations related to the property 102 by sending commands to one or more of the sensors 122 and one or more of the anchor devices 122. For example, the control panel 110 can change a thermostat setting, lock or unlock a door, open or close a garage door, or power on or off a light of the property 102 by sending a command to a particular anchor device or sensor at the property.

In some implementations, the control panel 110 also communicates with an authorized user mobile device, possibly through the network 105. The user mobile device may be associated with the property owner or a resident of the property 102 and may be, for example, a portable personal computing device, such as a cellphone, a smartphone, a tablet, a mobile device, or other electronic device. In some examples, the user mobile device is an electronic home assistant or a smart speaker. The system 100 also includes a monitoring server 160, which may be remote from the property 102. The monitoring server 160 can be, for example, one or more computer systems, server systems, or other computing devices. In some implementations, the monitoring server 160 is a cloud computing platform.

The control panel 110 communicates with the remote monitoring server 160 via a long-range data link. The long-range data link can include any combination of wired and wireless data networks. For example, the control panel 110 may exchange information with the monitoring server 160 through a wide-area-network (WAN), a cellular telephony network, a cable connection, a digital subscriber line (DSL), a satellite connection, or other electronic means for data transmission. The control panel 110 and the monitoring server 160 may exchange information using any one or more of various communication synchronous or asynchronous protocols, including the 802.11 family of protocols, GSM, 3G, 4G, 5G, LTE, CDMA-based data exchange or other techniques.

As described herein, the anchor devices 122 are configured to detect and process the signals emitted (e.g., encoding sensor data) by the sensors 120 to determine location or positional data about the sensors 120. The monitoring server 160 analyzes the data about the sensors 120 to obtain a current location of a sensor 120 at the property.

FIG. 1 includes stages A through D, which represent a flow of data. In stage (A), the control panel 110 located at the property 102 sends sensor/property data 125 to the remote monitoring server 160. Sensor/property data 125 can be a combination of sensor data that includes information describing attributes of the various signals emitted by each sensor 120 or property data including sensor status information about a monitoring function performed by a sensor 120. For example, the control panel 110 may send sensor data 125 that includes dimension measurements for rooms or exterior areas of property 102. The sensor data 125 can include dimension values that indicate a sensor's distance to each of the one or more anchor devices 122. In some instances, the sensor data 125 includes multiple sets of distance data, where each set of distance data indicates a sensors distance to an anchor device 122 using a respective value for each of three dimensions [x, y, z] of a room or area of the property.

In some implementations, anchor devices 122 are used to compute the distance values by referencing spatial or dimensional data for property 102 provided by control panel 110. For example, the control panel 110 receives sensor signal data from anchor devices 122 and uses the data to compute distance values for determining a location of sensors 120 at the property 102. In some cases, the control panel 110 can obtain or generate a digital representation of a floorplan for property 102. In some cases, the floorplan is presented for output to a user through the smart home software application installed on the user's mobile device. The floorplan can include data indicating spatial attributes of the property 102, such as dimensions and sizing information for various rooms at the property.

As described in more detail below, control panel 110 interacts with monitoring server 160 to determine the location of a sensor 120 by identifying the locations of at least one anchor device 122 at property 102, including spatial data for the location (e.g., a room where an anchor device is located). For example, an anchor device 122 may be positioned in a bedroom at property 102 and the spatial data for this bedroom location can indicate the size/dimension of the bedroom (e.g., 12 ft×15 ft). The system 100 can use at least the control panel 110 to analyze the strength of a signal transmitted by a sensor 120 against the spatial data to determine a location of the sensor 120 in the bedroom.

The property data 125 can include data collected by the one or more sensors 120, data related to the anchor devices 122, data generated by the control panel 110, or other monitoring system data. For example, the control panel 110 may send property data 125 that includes video or still images captured by cameras 120 in the property 102, motion sensing data, appliance data, data related to energy or other resource (e.g., water, natural gas) usage, system settings (e.g., a thermostat setting), audio data, or any other monitoring system data. In some cases, the property data 125 is processed by the control panel 110 before being sent to the monitoring server 160 (e.g., filtered or down-sampled image data, annotated data, transformed data, etc.). In some examples, the control panel 110 sends data related to the security status of the property monitoring system (e.g., armed, disarmed, home, away etc.) or the status of one or more points of entry to the property 102 (e.g., front door is locked, side window is open, etc.).

In stage (B), the control panel 110 sends sensor/property data 125 to the monitoring server 160. The control panel 110 communicates electronically with the monitoring server 160 through a wireless network, such as a cellular telephony or data network, through any of various communication protocols (e.g., GSM, LTE, CDMA, 3G, 4G, 5G, 802.11 family, etc.).

In stage (C), the monitoring server 160 analyzes the sensor signal data and or property data 125 received from the control panel 110. In some examples, the monitoring server 160 analyzes the sensor data 125 to verify, modify, or determine an initial location of the sensors 120, a change in the location of the sensors 120, or to detect motion of the sensors 120.

Based on the data analysis, in stage (D), the monitoring server 160 performs actions 165 and monitors the sensors to determine the location of the sensors 120 or detect relative motion of the sensors 120. In response to determining the location of the sensors at the property 102, the monitoring server 160 may perform any of various monitoring system actions, including setting an alarm or monitoring system status; sending a command to one or more devices of the monitoring system; sending a notification, alert, or message to an authorized user mobile device; sending a command to one or more sensors; and contacting third parties or emergency services, such as police, fire, or medical personnel. In some implementations, the monitoring server 160 sends a command to a monitoring system device to perform an operation. For example, the server 160 may command an audible alarm to sound, a door lock to secure, a light to turn on or off, or a camera to begin recording. In some examples, the server 160 elevates or downgrades the security status of the monitoring system or sends an alarm to a central alarm server.

In some implementations, the monitoring server 160 sends one or more notifications, alerts, or messages to an authorized user mobile device. The user mobile device can be associated with the property owner or any authorized user. The monitoring server 160 can send a notification or alert to a user mobile device through a wireless network such as a cellular telephony or wireless data network by any of various communication protocols (e.g., GSM, LTE, CDMA, 3G, 4G, 5G, etc.). In some examples, the monitoring server 160 may send a message through a software application installed on the authorized user mobile device.

Though the stages are described above in order of (A) through (D), it is to be understood that other sequencings are possible and disclosed by the present description. For example, in some implementations, the monitoring server 160 may receive property data 125 from the control panel 110 that includes both sensor status information and location information for each of sensor 120. In some cases, aspect of one or more stages may be omitted. For example, in some implementations, the monitoring server 160 may receive and/or analyze property data that includes only location information for rather than both sensor status data and location data.

Figure 2:
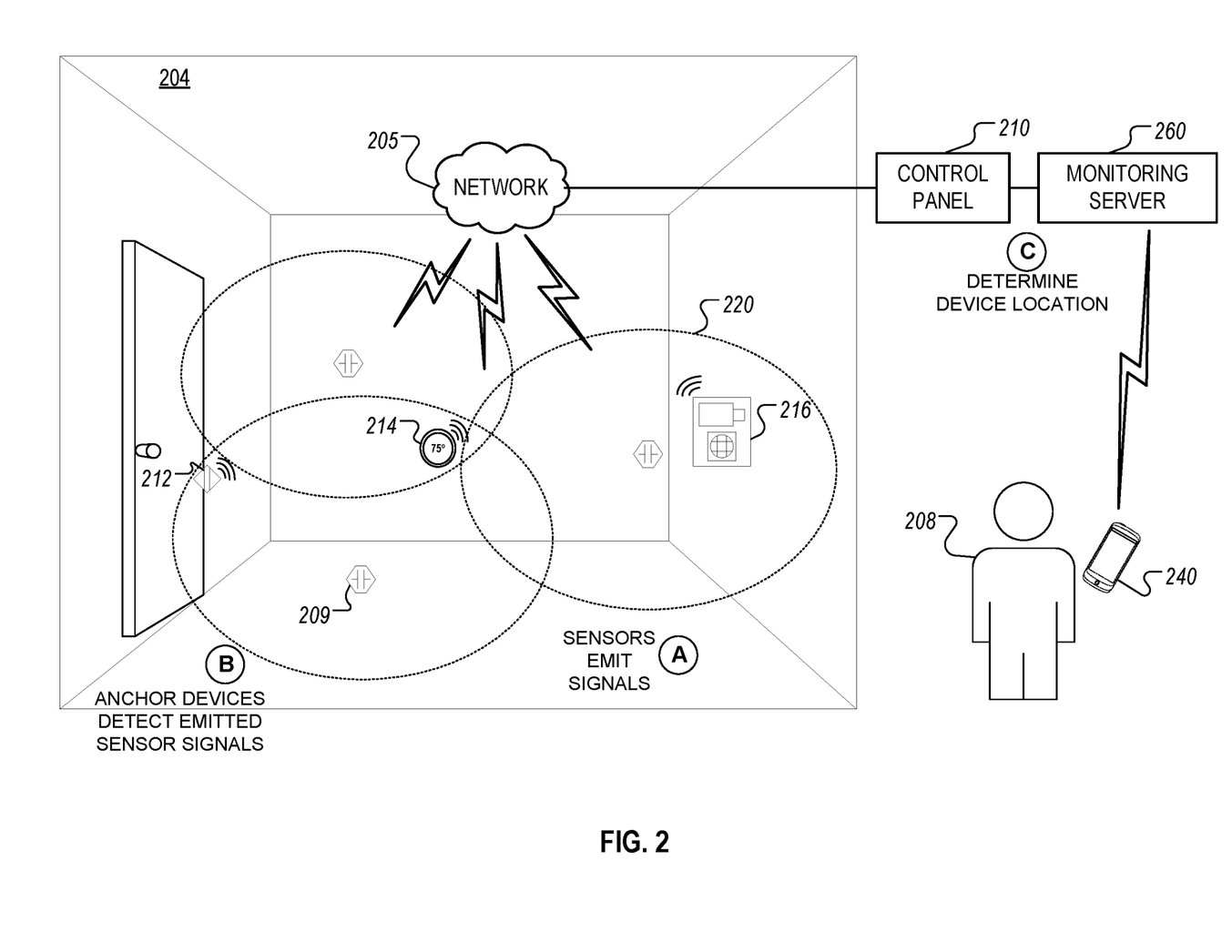
FIG. 2 shows example sensors and hardware devices that can be located at the property.

FIG. 2 shows example sensors and hardware devices that can be located within a computer network. A property monitoring system 200 includes a monitoring system control panel 210 within an example home property 102 that is connected to a short range network 205, also within the home. The network 205 may be wired or wireless and may comprise a local area network (LAN), the internet, Wi-Fi, Bluetooth, or other means for short-range electronic communications. The network 205 may communicate with one or more installed sensors 212, 214, 216 mounted in an area 204 (e.g., a room) and one or more home automation controls, as described previously in system 100 of FIG. 1.

In addition to the installed sensors and home automation controls, the monitoring system 200 also includes one or more anchor devices 209 that are located throughout area 204 of property 102. Each anchor device 209 (e.g., central nodes) may include onboard sensors, transceivers, receivers, transmitters, and various other hardware circuitry for detecting and processing radio signals emitted by sensors within property 102. Anchor devices 209 may each have onboard electronics, such as a computer processor, that enable it to perform computing functions and operations. For example, the anchor device 209 may perform computing functions that enable it to scan area 204 to identify or detect radio signal transmissions emitted by each of sensors 212, 214, 216. In some implementations, each anchor device 209 at area 204 includes a scanning region 220 that includes one or more sensors within the scanning region.

Anchor devices 209 communicate with the monitoring system control panel 210 through the network 205. In some cases, the anchor devices 209 may communicate wirelessly with the network 205, for instance, through Wi-Fi, Bluetooth, or other means for wireless data transfer. The anchor devices 209 may transmit data and other information to the control panel 210 through the network 205. For example, the anchor devices 209 may send data collected by its onboard sensors to the control panel 210. The anchor devices 209 may send unprocessed data, or the anchor devices 209 send data that has been processed or partially processed by its onboard electronics.

In system 200, the control panel 210 configures the anchor devices 209 to perform various actions to remotely monitor area 204 to detect existing or new sensors or other devices that may be emitting radio signals. In example (A), the radio signals emitted by sensors at area 204 can be used to detect that a new sensing device is present at property 102 or to detect or determine the location of a sensor at property 102. The anchor devices 209 may be also configured to receive commands or other data from the control panel 210. For example, an anchor device 209 may receive commands from the control panel 210 that cause the anchor device to initiate a scan of a certain region at area 204. In some implementations, sensor 216, a monitoring or recording device, is located within the area 204, while a property owner 208 is located outside of area 204. The owner 208 may be in another room of the home or may be outside of the home (e.g., at work, at a restaurant). Operation of monitoring sensor 216 causes the sensor to emit various radio signals that are detectable by a receiver or transceiver antenna of an anchor device 209. For example, the emitted radio signals are detected when an anchor device 209 initiates a scan to obtain radio signal data encoded at radio signals that are within a range defined by scanning region 220.

A monitoring server 260 may provide sensor or analyzed data to the owner 208 for display at a mobile device 240 of the owner. The monitoring server 260 may provide data to the mobile device 240 over a network, such as a cellular telephony network. In some implementations, the owner 208 may view and interact with the data through a software application accessible at the owner's mobile device 240. The owner 208 may also transmit information from his mobile device 240 to the monitor server 260. As discussed above with reference to system 100, in response to receiving or obtaining sensor data, analyzed data, and/or a command from the owner 208, the control panel 210 may direct the monitoring system to perform an action through any connected home automation controls. In system 200, the anchor devices 209 may also perform an action in response to a command from the owner 208. In example (B), the owner 208 has commanded one or multiple anchor devices 209 to initiate a scan within one or more predefined scanning regions 220 to determine the location of a new, or existing, sensing device installed at the property 102.

In example (C), the monitoring server 260 may automatically perform operations or actions to determine locations of sensors in response to receiving and analyzing sensor data from control panel. As described in more detail below, the sensor data received at monitoring server 260 can include measured signal strength values and one or more sets of distance metrics that are associated with radio signals emitted by sensors 212, 214, 216. Monitoring server 260 analyzes the sensor data to obtain or determine sensor locations with reference to x, y, and z dimensional axis. In some implementations, monitoring server 260 detects a location of a sensor by performing computations that use trilateration calculations to process signal data transmitted from the sensor. The results of the computations can yield accurate representations of positional data for enabled sensor devices installed at area 204 and throughout property 102. While FIG. 2 corresponds to performing actions (A), (B), and (C) within the sensor location framework, these actions should be understood to be non-limiting examples of the many actions that devices of system 200 might perform as part of a remote sensor location framework.

Figure 3:
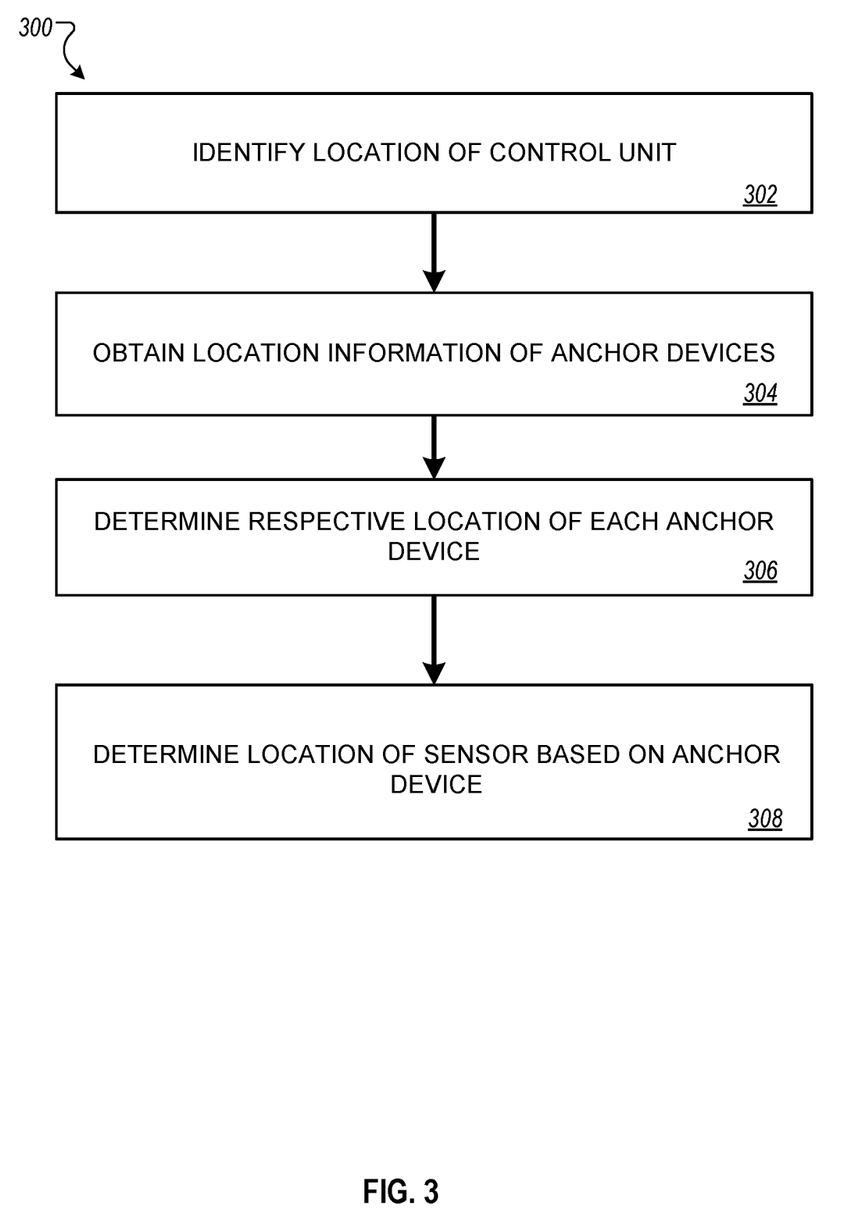
FIG. 3 shows an example process for locating devices at the property.

FIG. 3 shows an example process 300 for locating devices at the property 102. Process 300 can be implemented or executed using the systems described in this document. Thus, descriptions of process 300 may reference one or more of the above-mentioned computing resources of system 100. In some implementations, steps of process 300 are enabled by programmed instructions that are executable by processing devices and memory of the systems described in this document.

Referring now to process 300, monitoring server 160 identifies a location of a control panel 110 that may be located at or near a property (302). The control panel can be configured to communicate with a position module of monitoring server 160. The position module is configured to analyze sensor data obtained from sensors located at the property 102.

As discussed above, various devices pertaining to security and other operations at property 102 can be dispersed throughout rooms or other predefined areas of property 102. Each sensor or device can have a distinct function in various locations of the property. For example, sensor 212 can be a door sensor configured to detect when a door at property 102 has been opened, closed, locked, or unlocked. Sensor 214 can be a temperature sensor configured to detect or adjust a current temperature of area 204. Sensor 216 can be a monitoring or recording device that detects or records audio and video data for capturing movement and motion of objects or persons within a threshold proximity of sensor 216 or property 102.

In some instances, the location, position, or motion of a sensing device is often important to the devices functionality and usefulness at the property. For example, the location of temperature sensor 214 at a particular area or room of the property 102 can be important to obtaining accurate temperature readings to appropriately control and regulate internal conditions of room 204. In this context, process 300 includes techniques for determining and tracking the location(s) of various sensors and devices in a home security and home automation suite in order to improve functionality of these devices.

The monitoring server 160 obtains location information for one or more anchor devices that are located within a predefined area of the property (304). For example, each anchor device can be configured as a sensor or lighting device that uses Z-Wave technology to transmit data communications within an example computer network at property 102. In some implementations, each anchor device is at least one of: a Z-Wave enabled device, a Bluetooth enabled device, a Wi-Fi enabled device, or a radio device.

In some implementations, monitoring server 160 obtains location information for multiple anchor devices at property 102 and selects one or more anchor devices to function as an access points for an area of the property. For example, an application program managed at monitoring server 160 can be used to manually import or draw an initial digital mapping of the property. The mapping can include performing an initial placement of anchor devices and sensors at locations of a digital representation of the property. The placement locations are selected to match the actual real-world locations of the devices at the property 102.

Monitoring server 160 determines a respective location of each anchor device within the predefined area based on analysis of the location information transmitted by each anchor device or based on location information provided a user (e.g., owner 208) of the monitoring server (306). For example, the location of each anchor device can be manually set by owner 208. In some implementations, monitoring server 160 provides graphical instructions to owner 208 that identify one or more candidate locations for positioning an anchor device to detect signals emitted by sensing devices at property 102. In some implementations, determining or obtaining the location information for each anchor device at property 103 includes: i) scanning a predefined area for sensor signals emitted by each device that represents an anchor device of the predefined area; ii) detecting a respective set of signals emitted by each anchor device; and iii) automatically obtaining the location information based on analysis of the respective sensor signal(s) emitted by each anchor device.

Monitoring server 160 determines a location for a first sensing device (e.g., sensor 212) in a predefined area of the property (308). Monitoring server 160 determines the location of the sensing device based on analysis of sensor signals emitted by the sensor device that are detected by one or more anchor devices at property 102. In some implementations, monitoring server 160 uses the position information of at least one anchor device as a basis for determining the location of the sensing device. For example, the location of the sensor can be determined based on a computed distance between the anchor device and the sensor.

In some implementations, a location for a sensor corresponds to a distance metric that is defined using the x, y, and z axis for a three dimensional space [x: 3 ft, y: 2 ft, z: 10 ft]. Hence, the distance metric includes a set of three distinct distance values that are based on a three-dimensional characteristic of the predefined area. The distance metric is computed based on a trilateration algorithm or a multi-lateration algorithm that uses the respective location of each anchor device at property 102 to calculate a distance between the anchor device and a sensor. Monitoring server 160 uses a particular algorithm to analyze the distance metric against the known location of at least one receiving anchor device that detected signals emitted by the sensor.

For example, monitoring server 160 can use location multi-lateration to determine the location of a sensor that emits radio signals detected by the anchor device. Monitoring server 160 can determine a sensor's location by combining the calculated distance of the sensor from one of at least three anchor devices. In some implementations, an intersection of the scanning regions 220 created by the calculated distance as radii, pinpoints the location of the sensor device. The described techniques provides methods for detecting locations or relative motion of sensing devices that are not location-enabled. Using the computed location data for each sensor and a corresponding anchor device, the monitoring server 160 can perform automatic population of a digital rendering of property 102 with the precise locations of a home's security and sensing devices when these sensing devices are connected to the control panel.

Monitoring server 160 can use the computational processes for determining a sensor's location to also determine a relative motion of the sensor or to determine movement of an item to which the sensor is affixed. For example, monitoring server 160 can determine an initial location of a sensor based on the multi-lateration approach described above. This initial location can be used as a reference point against which subsequent location values can be compared. For example, subsequent location values that are computed for the sensor can be compared or analyzed against the reference location to determine whether the sensor has moved relative to its initial (or reference) location. In some implementations, monitoring server 160 iteratively computes new or updated sensor location values and iteratively compares the new location values to the reference value. Monitoring server 160 compares the new location values to the reference value to determine whether a sensor has been moved or tampered with, or whether the sensor is moving (e.g., floating in water during a flood at property 102). This comparison can also be used to determine whether an item (e.g., a door), to which the sensor is affixed, is moving, such as relative motion of the sensor indicating that a door is opened or closed.

Figure 4:
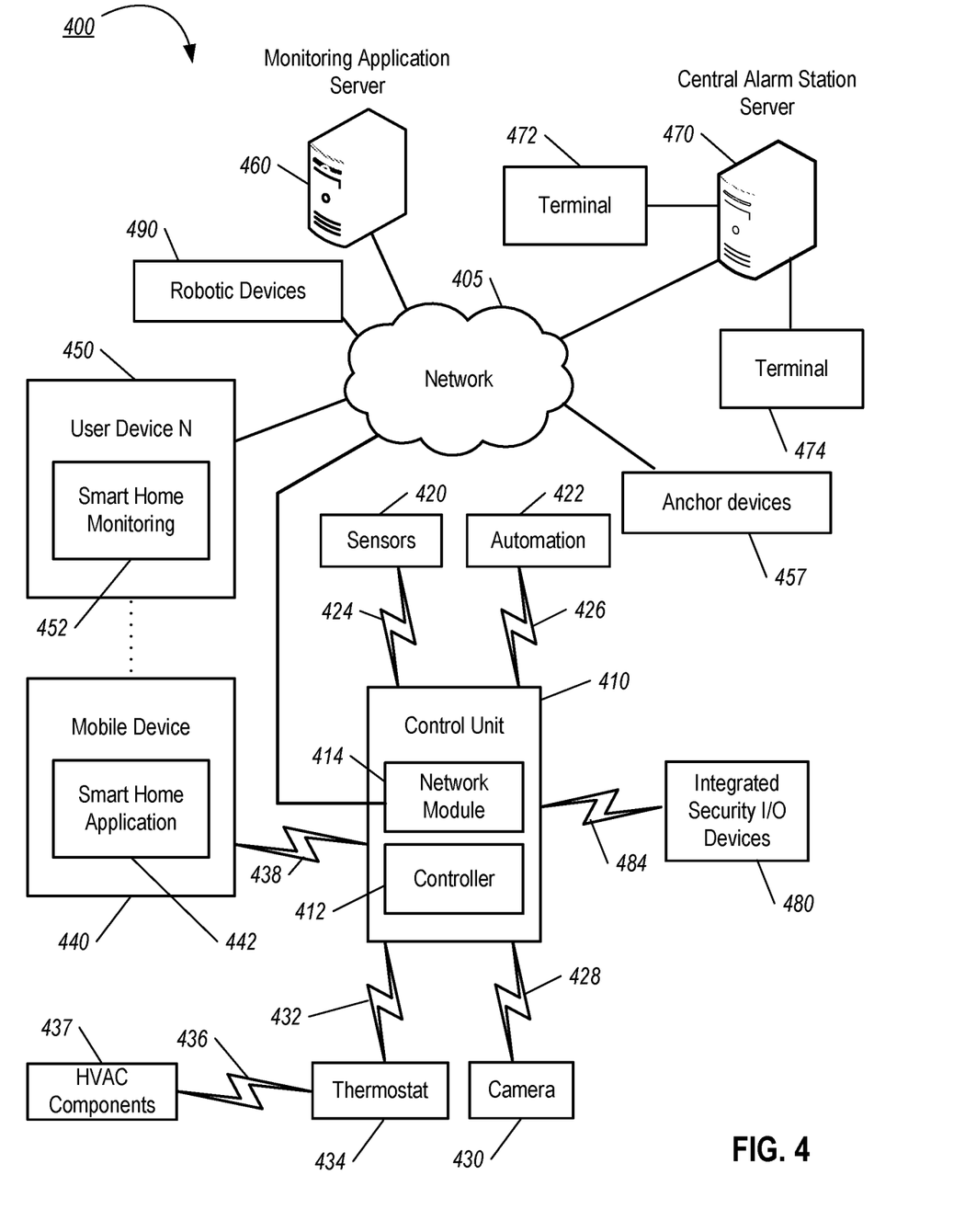
FIG. 4 shows a diagram illustrating an example property monitoring system.

FIG. 4 is a diagram illustrating an example of a property monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-Wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes one or more anchor devices 457. Each of the one or more anchor device 457 connects to control unit 410, e.g., through network 405. The anchor devices 457 can be computing devices (e.g., a computer, microcontroller, FPGA, ASIC, or other device capable of electronic computation) capable of receiving data related to the sensors 420 and communicating electronically with the monitoring system control unit 410.

The anchor device 457 receives data from one or more sensors 420. In some examples, the anchor devices 457 can be used to determine or indicate motion of the sensors 420 (e.g., whether the sensor 420 is in motion, its speed, and other motion parameters). The anchor device 457 can receive data from the one or more sensors 420 through any combination of wired and/or wireless data links. For example, the anchor device 457 can receive sensor data via a Bluetooth, Bluetooth LE, Z-Wave, or ZigBee data link.

The anchor device 457 communicates electronically with the control unit 410. For example, the anchor device 457 can send data related to the sensors 420 to the control unit 410 and receive commands related to determining locations of the sensors 420. In some examples, the anchor device 457 processes or generates sensor signal data, for signals emitted by the sensors 420, prior to sending it to the control unit 410. The sensor signal data can include distance values or a set of distance data that indicates a sensor's distance to an anchor device 457.

In some examples, the system 400 further includes one or more robotic devices 490. The robotic devices 490 may be any type of robots that can move and take actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to perform actions that are responsive to events at the monitoring system.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-Wave, Zig-Bee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that can charge multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or needs battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, ZigBee, Bluetooth, "Home Plug" or other "Power line" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-Wave, ZigBee, Home Plug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, and the anchor device 457. The one or more user devices 440 and 450 receive data directly from the sensors 420, the home automation controls 422, the camera 430, the robotic devices 490, and the anchor device 457 and sends data directly to the sensors 420, the home automation controls 422, the camera 430, the robotic devices 490, and the anchor device 457. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, and the anchor device 457 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, the robotic devices 490, and the anchor device 457 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, and the anchor device 457 to a pathway over network 405 when the one or more user devices 440 and 450 are farther from the sensors 420, the home automation controls 422, the camera 430, the thermostat 434, the robotic devices 490, and the anchor device.

In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, and the anchor device 457 to use the direct local pathway or whether the one or more user devices 440 and 450 are far enough from the sensors 420, the home automation controls 422, the camera 430, the thermostat 434, the robotic devices 490, and the anchor device 457 that the pathway over network 405 is required.

In other examples, the system leverages status communications (e.g., pinging) between the one or more user devices 440 and 450 and the sensors 420, the home automation controls 422, the camera 430, the thermostat 434, the robotic devices 490, and the anchor device 457 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, and the anchor device 457 using the direct local pathway. If communication using the direct local pathway is not possible, the one or more user devices 440 and 450 communicate with the sensors 420, the home automation controls 422, the camera 430, the thermostat 434, the robotic devices 490, and the anchor device 457 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
    determining, using location data of a first anchor device at a property that indicates a location of a first sensor at the property, a change in the location of the first sensor relative to a location the first anchor device, wherein the change in the location of the first sensor is determined at a monitoring system located at the property, the monitoring system configured to enhance security of the property;
determining a relative motion of the first sensor using a sensor reference signal and the determined change in the location of the first sensor relative to the first anchor device;
detecting signals emitted by the first anchor device;
obtaining location information for the first anchor device using analysis of the signals emitted by the first anchor device against a digital map of the property; and
utilizing the determined change in the location of the first sensor relative to the location of the first anchor device, changing a security status of the monitoring system at the property in response to the determined change in the location of the first sensor, the security status configured to be elevated or downgraded.

2. The method of claim 1, further comprising:
determining the location data of the first anchor device and a second anchor device; and
determining the location of the first sensor using the location data of the first anchor device and the second anchor device.

3. The method of claim 1, further comprising:
computing a distance metric for the first sensor using the location data of the first anchor device; and
determining the location of the first sensor using the computed distance metric for the first sensor.

4. The method of claim 3, further comprising:
computing three distinct distance values using a three-dimensional attribute of an area at the property.

5. The method of claim 1, further comprising:
scanning an area of the property for second signals emitted by a second anchor device within the area of the property;
detecting the second signals emitted by the second anchor device; and
obtaining location information for the second anchor device using analysis of the second signals emitted by the second anchor device against the digital map of the property.

6. The method of claim 5, further comprising:
determining the location of the first sensor and a second sensor located at the property using signal data from the first anchor device and the second anchor device that describes subset signals generated by a subset of the first sensor, the second sensor, and a third sensor; and
generate a positional mapping of the first sensor and the second sensor using the location of the first sensor and the second sensor.

7. The method of claim 1, wherein the first anchor device and a second anchor device comprise at least one of:
a z wave enabled device,
a bluetooth enabled device,
a wi-fi enabled device, or
a radio device.

8. The method of claim 1, further comprising:
analyzing, with the location data from the first anchor device, a strength of a signal transmitted by the first sensor to determine the location of the first sensor.

9. The method of claim 1, further comprising:
obtaining a digital representation of a floorplan for the property, wherein the floorplan includes data indicating spatial attributes of the property, including dimensions for one or more rooms at the property.

10. The method of claim 1, further comprising:
transmitting, by the first sensor, image data, video data, or motion sensing data, wherein the location data from the first anchor device is encoded in one or more radio signals emitted by the first sensor.

11. A system comprising one or more computers and one or more storage devices on which are stored instructions that are operable, when executed by the one or more computers, to cause the one or more computers to perform operations comprising:
determining, using location data from a first anchor device at a property that indicates a location of a first sensor at the property, a change in the location of the first sensor relative to the first anchor device, wherein the change in the location of the first sensor is determined at a monitoring system located at the property, the monitoring system configured to enhance security of the property;
determining a relative motion of the first sensor using a sensor reference signal and the determined change in the location of the first sensor relative to the first anchor device;
detecting signals emitted by the first anchor device;
obtaining location information for the first anchor device using analysis of the signals emitted by the first anchor device against a digital map of the property;
utilizing the determined change in the location of the first sensor relative to the first anchor device, changing a security status of the monitoring system at the property in response to the determined change in the location of the first sensor, the security status configured to be elevated or downgraded.

12. The system of claim 11, further comprising:
determining, by the monitoring system, the location data of the first anchor device and a second anchor device; and
determining, by the monitoring system, the location of the first sensor using the location data of the first anchor device and the second anchor device.

13. The system of claim 11, further comprising:
computing, by the monitoring system, a distance metric for the first sensor using the location data of the first anchor device.

14. The system of claim 13, further comprising:
computing, by the monitoring system, three distinct distance values that are using a three-dimensional attribute of an area at the property.

15. The system of claim 11, comprising:
determining the location of the first sensor and a second sensor located at the property using signal data from the first anchor device and a second anchor device that describes subset signals generated by a subset of the first sensor, the second sensor, and a third sensor; and
generating a positional mapping of the first sensor and the second sensor using the location of the first sensor and the second sensor.

16. One or more non-transitory computer storage media encoded with instructions that, when executed by one or more computers, cause the one or more computers to perform operations comprising:
determining, using location data from a first anchor device at a property that indicates a location of a first sensor at the property, a change in the location of the first sensor relative to the first anchor device, wherein the change in the location of the first sensor is determined at a monitoring system located at the property, the monitoring system configured to enhance security of the property;

determining a relative motion of the first sensor using a sensor reference signal and the determined change in the location of the first sensor relative to the first anchor device;

detecting signals emitted by the first anchor device;

obtaining location information for the first anchor device using analysis of the signals emitted by the first anchor device against a digital map of the property; and utilizing the determined change in the location of the first sensor relative to the first anchor device, changing a security status of the monitoring system at the property in response to the determined change in the location of the first sensor, the security status configured to be elevated or downgraded.

* * * * *